Figure 2A:
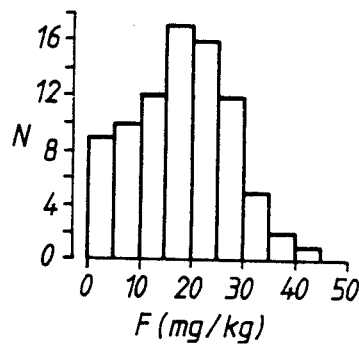

United States Patent [19]
Pye

[11] Patent Number: 4,971,818
[45] Date of Patent: Nov. 20, 1990

[54] METHOD OF SPRAYING HARVESTED CROPS

[75] Inventor: Barry J. Pye, Luton, England

[73] Assignee: National Research Development Corporation, London, England

[21] Appl. No.: 359,743

[22] PCT Filed: Nov. 20, 1987

[86] PCT No.: PCT/GB87/00825

§ 371 Date: May 9, 1989

§ 102(e) Date: May 9, 1989

[87] PCT Pub. No.: WO88/03748

PCT Pub. Date: Jun. 2, 1988

[30] Foreign Application Priority Data

Nov. 20, 1986 [GB] United Kingdom ............... 8627795

[51] Int. Cl.$^5$ .............................................. A23B 7/00
[52] U.S. Cl. .................................... 426/237; 426/310; 426/335
[58] Field of Search ............... 426/237, 310, 326, 335; 422/300

[56] References Cited

U.S. PATENT DOCUMENTS 2,466,906 4/1949 Miller ...................................... 239/3
2,585,799 2/1952 Lawrence ............................. 426/235
3,339,840 9/1967 Point ..................................... 118/309
4,818,546 4/1989 Whitford ............................. 426/310

FOREIGN PATENT DOCUMENTS 1204873 11/1965 Fed. Rep. of Germany .
1549961 8/1979 United Kingdom .

Primary Examiner—George Yeung
Attorney, Agent, or Firm—Cushman, Darby & Cushman

[57] ABSTRACT

A spray apparatus for the treatment of a harvested crop, the apparatus including a high voltage electrostatic spray head, a sprayhood surrounding the sprayhead and having an aperture opposite the sprayhead and insulating means to suspend the sprayhood with the aperture adjacent a region of a conveying path to establish and maintain the sprayhood covering said region of said conveying path, the sprayhood having on the outside an insulating cover and inside the cover an extensive insulated electrode extending around and above said aperture, the electrode being energizable in operation to a potential similar to that applied to the sprayhead, whereby the support means and electrode together permit the application of an electrostatically charged spray from the sprayhead in a controlled manner throughout said region of the conveying path under the sprayhood to a quantity of crop conveyed past on the conveying path in a regular manner.

13 Claims, 2 Drawing Sheets

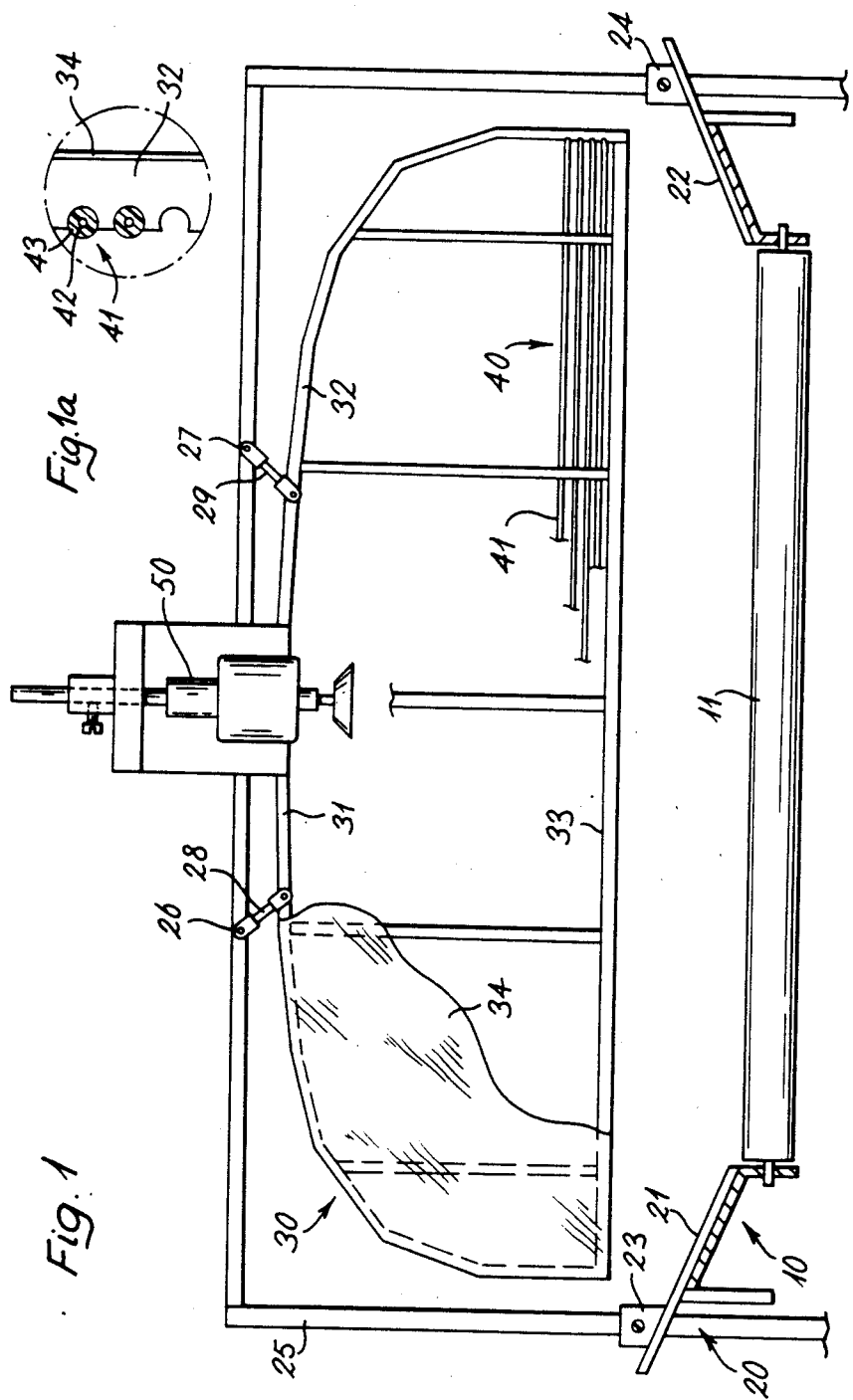

METHOD OF SPRAYING HARVESTED CROPS

This invention relates to the treatment of harvested crops, such as fruit and vegetables.

Harvested crops are often treated, for example before storage or on removal for planting or sale, to inhibit decay or pest attack or control the maturing of the crop. A convenient technique is to spray the crop, such as potatoes for food or seed or a fruit such as oranges, while it is on a conveyor. Regulations for the use of chemicals put close limits on the dosage of the crop and for this reason, and for economy and effectiveness, it is desirable that only the minimum required amount of chemical be applied uniformly to each item of the crop. Such uniform application should be made rapidly as treatment is a seasonal requirement and large quantities of crop need to be handled quickly, for example to prevent spoilage. Furthermore the apparatus by which the crop is treated has to be robust to withstand an agricultural or warehouse enviroment.

It is an object of the present invention to provide an apparatus for the efficient economic treatment of harvested crops.

According to the invention there is provided a spray apparatus for the treatment of a harvested crop, the apparatus including a high voltage electrostatic sprayhead, a sprayhood surrounding the sprayhead and having an aperture opposite the sprayhead and insulating means to suspend the sprayhood with the aperture adjacent a region of a conveying path to establish and maintain the convering said region of sprayhood said conveying path, the sprayhood having on the outside an insulating surface and inside an extensive insulated electrode extending around and above said aperture, the electrode being energisable in operation to a potential similar to that applied to the sprayhead, whereby the suspension means and electrode together permit the application of an electrostatically charged spray from the sprayhead in a controlled manner throughout said region of the conveying path under the sprayhead to a quantity of crop conveyed past on the conveying path in a regular manner.

The sprayhood is conveniently provided with a frame of ribs having on the inside means to receive an insulated wire to form the electrode. The insulating surface is conveniently shaped from sheet material to fit closely over the ribs. The hood may be of generally rectangular or square form with an apex at which the sprayhead is placed and may be wound over the inside, on the ribs, with an insulated wire as the electrode. The means to suspend the hood may be insulated suspension links extending from the sprayhood. The suspension means may be attached near to the apex of the hood. There may be support means for the sprayhood to which the insulating links extend. The support means may include guide means to constrain the crop to the conveying path. The spray may be controlled to be a uniform or other pattern across the conveying path.

The voltage applied to the electrode is of the same polarity as that of the charge on the spray and of similar potential. The sprayhead is arranged to produce spray particles of a VMD less than 100 microns.

Embodiments of the invention will now be described with reference to the accompanying drawings in which:

FIG. 1 shows a cross-sectional elevation of a spray apparatus according to the invention, FIG. 1a is an enlargement of a portion of FIG. 1, and FIGS. 2a–2d and 3 show charts of results of treatment by the apparatus embodying the invention.

In FIG. 1 a roller table conveyor of conventional form is shown in outline at 10 and a roller indicated at 11.

A support frame generally indicated at 20 is fitted to the roller table with sloping guide plates 21, 22 and height adjustment clamps 23, 24. The guide plates are conveniently shaped to fit snugly to the roller table without any fastening. A support hoop 25 fits into the clamps to be held at a chosen height. Conveniently there are two hoops 25 spaced along the roller table in respective clamps on one set of guide plates. Each support hoop has two support point 26, 27. The four points are conveniently at the corners of a square. Adjustable insulating suspension means 28, 29, (not shown in detail) are attached to the support points to support a sprayhood indicated generally at 30. The suspension is arranged so that the hood is clear of any other structure. The hood is conveniently square in plan and dome-like in elevation and has an open end. In one embodiment the roller table is about one meter wide and the hood is thus about one meter square to cover a region which is a meter long and the whole width of the table. At the central top of the hood, opposite the open end, is an electrostatic spray head 50 preferably of the rotary type. The sprayhead is adjustable in height in the hood. The hood itself is about 300 millimeters high.

The hood is a light, simple structure but strong enough to resist hard use. In one embodiment the hood has a frame of four diagonal ribs extending from the central sprayhead mounting to the corners of the hood. Two of these diagonal ribs are at 31, 32 and the suspension means 28, 29 are attached to them. Frame elements such as 33 define the four sides of the opening of the hood. The sides of the hood are framed by subsidiary elements curved in elevation to shape the hood. Longitudinal stiffeners can be added if needed. The inside of the frame has a further function to carry an electrode 40. Electrode 40 is conveniently a length of cable 41 wound around the inside of the hood frame, which is provided with notches, hooks, holes or like structures to receive and retain the cable 41 in a spaced arrangement of turns on the inside of the hood, somewhat as shown in FIG. 1 in the enlarged "scrap section". The winding extends from the bottom, open end, of the hood to the central top portion around the sprayhead to be all around and above the open end. Preferably the turns are about 10 millimeters apart. The end of the cable at the bottom of the hood is insulatingly sealed to be waterproof.

For the hood shown some thirty turns are involved so 100 to 150 meters of cable are needed to wind a hood. The conductor of the cable is connected at the top of the hood to a source of electrical potential of several thousand volts so a certain minimum overall diameter for the insulation of the cable is needed to avoid corona. In choosing the conductor part 42, which may be of copper or other metal, case is needed to ensure that this is large enough to avoid excessive voltage stress at the surface which could cause a discharge into the insulation 43. One suitable form is a flexible cable with a plain copper stranded 30/0.25 millimeters centre about 1.8 millimeter in diameter and a PVC sheath about 0.8 millimeter thick. As the cost of the electrode is a significant part of the cost of the whole apparatus care is needed in its choice. Other forms of conductor for the electrode are possible provided corona is avoided and a waterproof arrangement is used. Thus radial insulated conductors may be used, radiating from a connection at the top of the hood. A metallic film, e.g. deposited by spraying or silk screening on a plastic sheet material, could also be used if insulated. Thus the metallic film could be on the outside of a plastics sheet attached to the inside of the hood frame. Other constructions will be apparent to those skilled in the art. The spacing of the conductor turns in that form of the electrode is believed to be important. If too close too much electrode is needed. If too far apart the spray can wet the hood. If the ambient humidity is high precautions against "flashover" due to condensation on the sprayhead may be needed.

It is important that the electrode extends all round the open end of the sprayhood and above the area of the table inside the hood. This gives a uniformity of a spray application needed for the treatment of harvested crops.

A very convenient form of construction for the hood frame is plastic mouldings as these can be formed in sections, with the hooks, notches, holes, etc. in place, to be welded or even "snapped" together.

Over the outside of the hood frame is an insulating surface of thin strong insulating material 34 such as polyethylene sheet. This can be shaped to be a close fit over the hood to keep the cover in place. The surface stops wind affecting the spray pattern. The apparatus can therefore be used out of doors as well as indoors and achieve controlled results.

The whole hood is suspended as described above so as to be adjustable in height from the roller table. It is believed that it is important for efficient operation that the insulating suspension ensures that the hood is clear of any other structure so that no leakage of charge can occur. Wetting of the hood by spray is also reduced when this is done. The suspended cage does not get wet so easily if it can not leak charge.

In use the electrode 40 is energised to control the charged spray fan from sprayhead 50 and the heights of the hood and sprayhead adjusted to produce a required area of uniform spray deposit on the crop on the roller table. A suitable sprayhead is described in UKPS No. 2073053. If the hood is raised too far from the conveyor controlled application is affected.

The potential applied to the electrode is substantially the same as that applied to charge the spray. The sprayer is of the direct charge type which requires a potential of some tens of kilovolts. Typically a voltage in the range of 15 kilovolts to 30 kilovolts is used. The potential on the electrode need not be from the same source as that for the sprayer but is of the same polarity and preferably in a range between 10% below and above the sprayer potential. It has been found that a difference of more then 25% can cause the spray to be attracted to the hood which impairs the action of the apparatus. A negative polarity is preferred. Among other reasons a negative charge is "held" by polyethylene more effectively than is a positive charge. It is believed that the polyethylene sheet 34 outside the electrode, when kept dry, can charge between the electrode turns and assist in spray control.

The sprayhead typically requires 10 to 20 micro amperes and the electrode about one micro ampere.

The sprayhead is preferably arranged to operate at high speed to reduce the drop size. At a speed of 12000 rpm most droplets are smaller than 90 microns and a volume median diameter (VMD) of about 70 microns is achieved. Small, highly charged, drops are preferred as these do not get through the layer of crop to be wasted by landing on the roller table. The drops form a cloud which spreads rapidly because the drops are of the same polarity. The spread of the cloud is controlled by the field from the electrode so that the drops occupy a volume within which they spread by mutual repulsion to a relatively uniform distribution and so land on the crop on the roller table in a similar uniform distribution over an area set by the adjustments mentioned above. The extensive electrode mentioned above is important in bringing about the mutual repulsion of the drops to a uniform distribution inside the volume defined by the electrode.

More than one sprayhead can be used and equalisation of spray distribution is still achieved.

The one meter square hood is effective with roller table speeds for one half to two tons of crop such as potatoes per hour. The sprayhead can be set to deliver between 20 and 50 milliliters of spray per minute by control of supply pump. If required the spray dilution can also be adjusted to achieve a particular dosage.

The crop is rolled around by the roller table so that all parts are exposed.

Figure 2B:
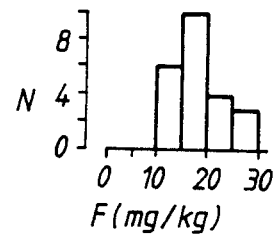
Figure 2C:
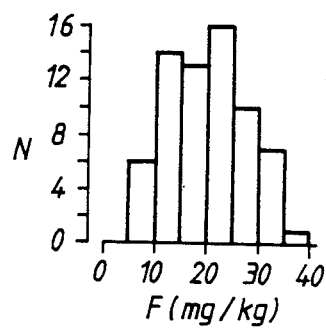
Figure 2D:
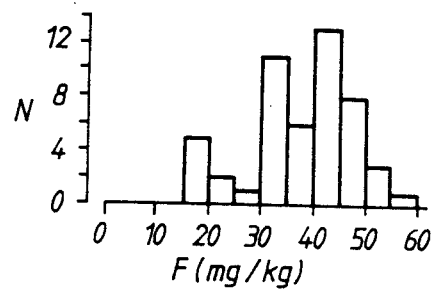

The action of the apparatus has been compared with various existing spray apparatus for applying fungicide to potato tubers. The fungicide used was thiabendazole at 40 grams per tonne of tubers. The fungicide was dissolved in an appropriate amount of water. FIGS. 2A, 2B, 2C show for existing apparatus the resulting amounts of F of fungicide (in milligrams/kilogram) against the number (N) of tubers. Generally half the fungicide is wasted as it is not deposited on the tubers. In some cases much more than half is wasted. Also some tubers received insignificantly small amounts. FIG. 2D shows the results for an embodiment of the invention. These indicate that about 38 grams of fungicide are deposited per tonne of tubers. This is about 95% of the fungicide dispersed by the sprayhead and shows a significant improvement in the use of the fungicide. Furthermore, the loss of fungicide to the environment is greatly reduced. All the tubers received a significant dose of fungicide.

In addition to the improvement in the proportion of spray reaching the tubers the uniformity of deposit over the surface of a tuber is improved. The small drops, less than 100 micro meters, produce more drops per unit area and increasing the volume of water for a given amount of fungicides produces more drops per unit area.

Figure 3:
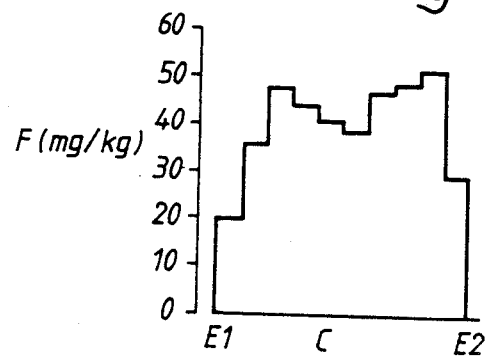

Furthermore the apparatus embodying the invention produced a relatively uniform level of fungicide deposit across the width of the table. FIG. 3 shows the variation of fungicide deposit (F) from one edge (E1) through the centre (C) to the other edge (E2) of the table for the same 40 grams of fungicide per tonne of tuber ( in 400 milliliters of water for 40 grams of fungicide). Again the enhanced minimum level ensures adequate dose rate.

Examination of plants and tubers resulting from cultivated seed tubers treated with fungicide by the apparatus embodying the invention shows significant improvement in resistance to disease.

Nearly 90% of plants from untreated tubers and 50% of the tubers from these plants showed signs of disease while only about 30% of plants from such treated tubers and 10% of the tubers from these plants showed signs of disease (in similar growing conditions). After storage the improvement was similar.

The electrostatic sprayhead with the extensive electrode inside a hood providing support and protection can thus produce a uniform deposit of material on harvested crops, even where winds or draughts occur, as in yards or warehouses, while avoiding waste of material or risk of contamination by material not reaching the harvested crop.

The apparatus described above provides an economic, tough, spray apparatus for treatment of harvested crop. The insulating surface to the hood both prevents air currents affecting the spray and prevents an operator making contact with high voltage areas. The surface can safely be touched in use.

I claim:

1. A method of spraying harvested crop including:
   moving the crop along a conveying path,
   surrounding and covering a region of said path with an electrode,
   providing under said electrode a source of electrostatically charged spray, and
   energizing said electrode to the same polarity as the spray for causing a substantially uniform cloud of spray across said region and a substantially uniform deposit of spray on said crop moving along said path.

2. A method of treating harvested crop including:
   moving the crop to be treated along a path,
   causing all parts of the moving croo to be exposed for treatment,
   spraying treatment liquid in droplets over said path,
   charging the treatment liquid droplets for mutual repulsion as a spreading cloud of droplets, and
   charging an electrode disposed over said path with a charge similar to that on the droplets to control the spread of said cloud
   for causing a substantially uniform cloud of spray over said path and a substantially uniform deposit of spray on said crop moving along said path.

3. A method according to claim 2 including applying a potential in the range of 15 kilovolts to 30 kilovolts to charge the treatment liquid droplets.

4. A method according to claim 2 including applying a potential to charge the treatment liquid droplets and applying a potential to charge said electrode in a range within 25% of that applied to charge the treatement liquid droplets.

5. A method according to claim 2 including spraying droplets of a volume median diameter of 70 microns and individually generally smaller than 90 microns diameter.

6. A method according to claim 2 including supporting said electrode on polyethylene sheet and charging to a negative polarity.

7. A method according to claim 2 wherein said step of moving the crop to be treated comprises moving potato tubers to be treated with fungicide and including depositing in excess of 90% of sprayed fungicide at a rate of 38 grams per tonne of potato tubers.

8. A method according to claim 2 including moving the crop along said path on a roller table to roll the crop around.

9. A method according to claim 2 including providing the electrode between inner and outer plastics surfaces.

10. A method of spraying harvested crop including moving the crop along a conveying path,
    surrounding and covering a region of said path with an electrode to extend around and over said path,
    providing inside said extensive electrode a source of electrostatically charged spray,
    energizing said electrode to the same polarity as the spray, thereby causing a substantially uniform cloud of spray across said region and a substantially uniform deposit of spray on said crop moving along said path.

11. A method of treating harvested crop including:
    moving the crop along a path for treatment,
    causing all parts of the moving crop to be exposed for said treatment,
    spraying treatment liquid in droplets over the treatment path,
    charging the treatment liquid droplets for mutual repulsion as a spreading cloud of droplets,
    providing an electrode around and over the path and sprayed droplets, and
    controlling the spread of said cloud with a similarly charge on said electrode similar to that on the droplets,
    thereby causing a substantially uniform cloud of spray over said path and a substantially uniform deposit of spray on said crop moving along said path.

12. A method of spraying harvested crop including:
    moving the crop along a conveying path,
    surrounding and covering a region of said path with means defining a sprayhood having an open end in facing relation to said path and having an electrode provided therewithin,
    providing a source of electrostatically charged spray inside said sprayhood means, and
    energizing said electrode to the same polarity as the spray, thereby causing a substantially uniform cloud of spray across said region and a substantially uniform deposit of spray on said crop moving along said path.

13. A method of treating harvested crop including:
    moving the crop to be treated along a path,
    causing all parts of the moving crop to exposed for said treatment,
    providing means defining a sprayhood having an open end in facing relation to a region of said path,
    providing an electrode within said sprayhood means,
    spraying treatment liquid from within said sprayhood means in droplets over said region of the path,
    charging the treatment liquid droplets for mutual repulsion as a spreading cloud of droplets, and
    charging said electrode with a charge similar to that on the droplets for controlling the spread of said cloud
    thereby causing a substantially uniform cloud of spray over said path and a substantially uniform deposit of spray on said crop moving along said path.

* * * * *